US011303454B2

(12) United States Patent
Herrin et al.

(10) Patent No.: US 11,303,454 B2
(45) Date of Patent: Apr. 12, 2022

(54) PRODUCING AND VERIFYING COMPUTATIONAL DETERMINATIONS USING A DISTRIBUTED LEDGER

(71) Applicant: International Business Machines Corporation, Armonk, NY (US)

(72) Inventors: Bradley C. Herrin, Apex, NC (US); Xianjun Zhu, Cary, NC (US); Bo Zhang, Cary, NC (US); Alexander Sobran, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 16/202,685

(22) Filed: Nov. 28, 2018

(65) Prior Publication Data

US 2020/0169409 A1 May 28, 2020

(51) Int. Cl.
*H04L 29/06* (2006.01)
*H04L 9/32* (2006.01)
(Continued)

(52) U.S. Cl.
CPC .......... *H04L 9/3239* (2013.01); *G06N 20/00* (2019.01); *H04L 9/0643* (2013.01)

(58) Field of Classification Search
CPC ...... G06F 16/27; H04L 9/3236; H04L 9/3239
See application file for complete search history.

(56) References Cited

U.S. PATENT DOCUMENTS

2017/0132626 A1 5/2017 Kennedy
2017/0279783 A1 9/2017 Milazzo et al.
(Continued)

FOREIGN PATENT DOCUMENTS

WO 2018078584 A1 5/2018
WO 2018089843 A1 5/2018

OTHER PUBLICATIONS

Jamthagen et al., "Blockchain-Based Publishing Layer for the Keyless Signing Infrastructure", 2016 International IEEE Conferences on Ubiquitous Intelligence & Computing, Advanced and Trusted Computing, Scalable Computing and Communications, Cloud and Big Data Computing, Internet of People, and Smart World Congress, Jul. 18-21, 2016, pp. 374-381, DOI 10.1109/UIC-ATC-ScalCom-CBDCom-IoP-SmartWorld.2016.30.

(Continued)

*Primary Examiner* — Izunna Okeke
(74) *Attorney, Agent, or Firm* — William H. Hartwell

(57) ABSTRACT

Software for producing and verifying computational determinations using a distributed ledger, by: (i) receiving a first input from a user; (ii) producing a first computational determination utilizing a first computational model, wherein the first computational determination includes a first computational output that is based, at least in part, on the first input; (iii) computing a hash of the first computational model; (iv) sending a record of the first computational determination to a verification system, wherein the record of the first computational determination includes the hash of the first computational model; (v) receiving a verification from the verification system indicating that the hash of the first computational model matches a hash of a second computational model and that the record of the first computational determination has been stored in a first distributed ledger; and (vi) in response to receiving the verification, providing the first computational output to the user.

17 Claims, 5 Drawing Sheets

(51) Int. Cl.
  *G06N 20/00* (2019.01)
  *H04L 9/06* (2006.01)

(56) References Cited

U.S. PATENT DOCUMENTS

| | | |
|---|---|---|
| 2018/0025181 A1 | 1/2018 | Barinov et al. |
| 2019/0121889 A1 | 4/2019 | Gold |
| 2019/0236598 A1 | 8/2019 | Padmanabhan |
| 2019/0324958 A1* | 10/2019 | Ow ............ H04L 9/0637 |
| 2019/0334723 A1 | 10/2019 | Endress |

OTHER PUBLICATIONS

Kurtulmus et al., "Trustless Machine Learning Contracts; Evaluating and Exchanging Machine Learning Models on the Ethereum Blockchain", arXiv:1802.10185v1 [cs.CR] Feb. 27, 2018, 11 pages.

Marr, Bernard, "Artificial Intelligence And Blockchain: 3 Major Benefits of Combining These Two Mega-Trends", Mar. 2, 2018, Forbes, 5 pages, <https://www.forbes.com/sites/bernardmarr/2018/03/02/artificial-intelligence-and-blockchain-3-major-benefits-of-combining-these-two-mega-trends/#20b8f6234b44>.

Ramachandran, et al., "SmartProvenance: A Distributed, Blockchain Based DataProvenance System", Cloud Security, CODASPY'18, Mar. 19-21, 2018, Tempe, AZ, USA, pp. 35-42, <https://doi.org/10.1145/3176258.3176333>.

IBM, "List of IBM Patents or Patent Applications Treated as Related", Appendix P, 2 pages, dated Dec. 3, 2018.

Herrin et al., "Immutably Storing Computational Determinations Using Distributed Ledgers", U.S. Appl. No. 16/202,661, filed on Nov. 28, 2018, 35 pages.

* cited by examiner

PRODUCING AND VERIFYING COMPUTATIONAL DETERMINATIONS USING A DISTRIBUTED LEDGER

BACKGROUND

The present invention relates generally to the field of distributed ledger-based systems, and more particularly to systems for producing and verifying computational determinations using a distributed ledger.

Blockchain refers to a distributed, permissioned, and immutable ledger capable of recording transactions. Blockchain is a decentralized technology consisting of a peer-to-peer (P2P) network including computers referred to as nodes. Blockchain further includes methods for the nodes to validate transactions. Once a transaction is validated by the nodes, a new block is added to the existing blockchain containing information to confirm the transaction.

Artificial Intelligence (AI) is broad field of computer science that generally applies to situations where machines mimic cognitive functions that humans associate with human minds. Machine Learning (ML) is a field within AI that refers to the ability of a computer to learn and make predictions instead of relying on static program instructions. Machine learning is often employed for tasks where designing and implementing static program instructions with good performance is difficult or infeasible, such as in email filtering, detection of network intruders, and computer vision.

SUMMARY

According to an aspect of the present invention, there is a method, computer program product, and/or computer system that performs the following operations (not necessarily in the following order): (i) receiving a first input from a user; (ii) producing a first computational determination utilizing a first computational model deployed in a production environment, wherein the first computational determination includes a first computational output that is based, at least in part, on the first input; (iii) computing a hash of the first computational model using a cryptographic hash function; (iv) sending a record of the first computational determination to a verification system, wherein the record of the first computational determination includes the hash of the first computational model; (v) receiving a verification from the verification system indicating that the hash of the first computational model matches a hash of a second computational model and that the record of the first computational determination has been stored in a first distributed ledger; and (vi) in response to receiving the verification, providing the first computational output to the user.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
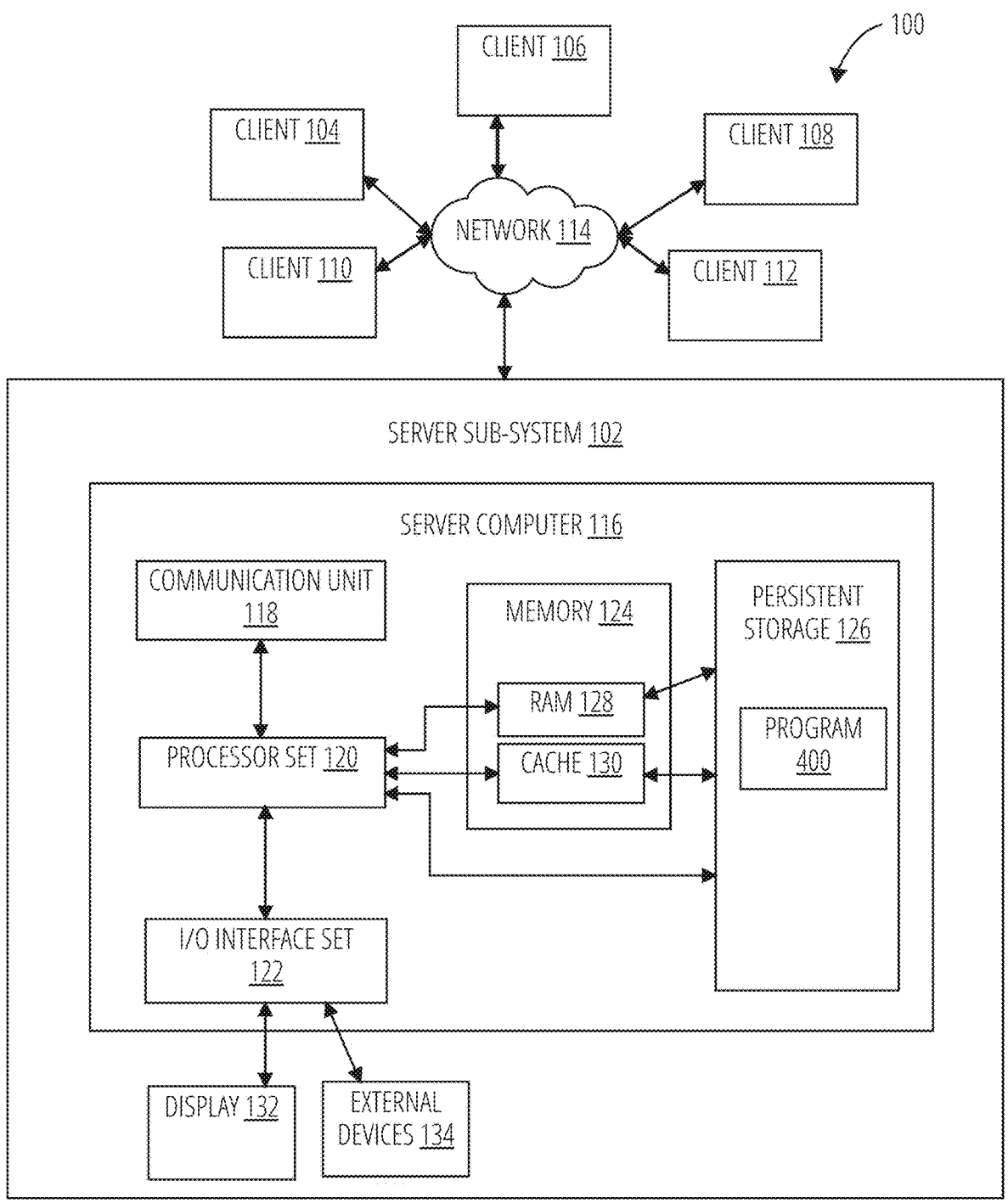
FIG. 1 is a block diagram depicting networked computers system 100, according to an embodiment of the present invention.

Embodiments of the present invention recognize that Artificial Intelligence (AI) and Machine Learning (ML) are prevalent throughout many product domains, and that the models built using these techniques have a vast influence on end users. For example, in some cases ML models are used for loan approval and insurance premium estimation. In these cases, it can be imperative—for ethical, regulatory, and potentially legal reasons—to be able to explain why particular predictions have been made by ML models.

Embodiments of the present invention solve these problems using distributed ledger (e.g., blockchain) technology. In an embodiment, two blockchains are used: one to store machine learning models and the other to store model inferencing events. In this embodiment, by using blockchain technology, the history of models used along with any inferences delivered by those models are immutably stored, thereby allowing guaranteed AI traceability as required by policy and/or regulation.

For example, if a company is alleged to have used an ML model in a non-permitted way, embodiments of the present invention can retrieve, verify, and present the correct associated model and inferencing events used by the company in order to determine whether the use was compliant with regulations. And by storing both the model and its corresponding inferencing events, embodiments of the present invention can help to determine whether bias is present in either the model itself or one of its inferencing events. Furthermore, by only requiring the storing of the model and its inferencing events, and not all of a user's data, embodiments of the present invention can reduce the amount of user information required to perform the above-described determinations.

In some embodiments, AI models deployed to production are themselves stored on a blockchain, including preprocessing code/parameters, model code/parameters, and associated metadata such as time of deployment. The models can then be represented as unique hashes.

In these embodiments, when a model deployed to production performs inferencing when interacting with a user (for example, when a user submits a loan application and the model determines whether the user is approved) the associated data and the result of that inferencing event are stored on the second blockchain along with the model's hash from the first blockchain. Associated data generally includes the data input into the model, and may include data or feature sets provided from the user or retrieved from other locations. The associated data, inference result, and model hash are only stored on the second blockchain if the model hash can be found on the first chain and the inference result is verified using the data and model.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-system 104; client sub-system 106; client sub-system 108, client sub-system 110, client sub-system 112; communication network 114; server computer 116; communication unit 118; processor set 120; input/output (I/O) interface set 122; memory device 124; persistent storage device 126; display device 132; external device set 134; random access memory (RAM) devices 128; cache memory device 130; and program 400.

Sub-system 102, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 400 is a collection of machine readable instructions and/or data that is used to create, manage and control certain software functions that will be discussed in detail, below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device 124 and persistent storage device 126 are computer-readable storage media. In general, memory device 124 can include any suitable volatile or non-volatile computer-readable storage media. It is further noted that, now and/or in the near future: (i) external device set 134 may be able to supply, some or all, memory for sub-system 102; and/or (ii) devices external to sub-system 102 may be able to provide memory for sub-system 102.

Program 400 may include a distributed, permissioned, and immutable ledger such as a blockchain. In some embodiments, the blockchain consists of multiple nodes that communicate with each other. In some embodiments, the blockchain may include nodes of three types: (i) client nodes that submit transaction-invocations, (ii) peer nodes that commit transactions and maintain the state and a copy of the ledger, and (iii) orderer nodes that implement communication services with delivery guarantees, such as atomic or total order broadcast.

Program 400 may also include one or more consensus mechanisms for validating transactions before they are permanently stored on a block of the blockchain. In some embodiments of the present invention, consensus is the verification of the correctness of one or more transactions comprising a block. Consensus may be achieved when the order and results of one or more transactions in a block have met the explicit policy criteria checks. Consensus methods may include endorsement policies to dictate which specific members of a permissioned blockchain network must endorse a certain transaction class. Consensus methods may further employ chaincode (e.g., a prescribed interface for a business logic agreed to by members of the permissioned blockchain) to ensure that the endorsement policies are enforced by, for example, verifying that enough endorsements are present and/or verifying that the endorsements derived from the appropriate members of the permissioned blockchain network. After verifying the appropriate endorsements are present, a versioning check may include an agreement or consent of the current state of the ledger before any blocks containing transactions are appended to the ledger.

Program 400 may also include programs called chaincode, hold state and ledger data, and execute transactions. Program 400 chaincode may be used for executing smart contracts (e.g., automatically executing transactions and recording information onto the ledger) based on events occurring on the blockchain. Smart contracts may also include mutually-agreed conditions by members of a permissioned blockchain network for transactions to take place. The chaincode may be the central element of the blockchain as transactions are operations invoked on the chaincode. In some embodiments, transactions may have to be "endorsed" and only endorsed transactions may be committed and have an effect on the state. In some embodiments, the blockchain may include one or more special chaincodes for management functions and parameters, collectively called system chaincodes. In an exemplary embodiment, program 400 may be implemented in a framework such as Hyperledger Fabric. (Note: the term(s) "HYPERLEDGER" and/or "HYPERLEDGER FABRIC" may be subject to trademark rights in various jurisdictions throughout the world and are used here only in reference to the products or services properly denominated by the marks to the extent that such trademark rights may exist.)

Program 400 is stored in persistent storage device 126 for access and/or execution by one or more of the respective computer processors of processor set 120, usually through one or more memories of memory device 124. Persistent storage device 126: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device 126. Program 400 may also be stored and accessed from a public or private cloud service (e.g., blockchain-as-a-service). program 400 may include both machine readable and performable instructions and/or substantive data (that is, the type of data stored in a database). In this particular embodiment, persistent storage device 126 includes a magnetic hard disk drive. To name some possible variations, persistent storage device 126 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage device 126 may also be removable. For example, a removable hard drive may be used for persistent storage device 126. Other examples include optical and magnetic disks, thumb drives, and smart cards that are inserted into a drive for transfer onto another computer-readable storage medium that is also part of persistent storage device 126.

Communication unit 118, in these examples, provides for communications with other data processing systems or devices external to sub-system 102. In these examples, communication unit 118 includes one or more network interface cards. Communication unit 118 may provide communications through the use of either or both physical and wireless communications links. Any software modules discussed herein may be downloaded to a persistent storage device (such as persistent storage device 126) through a communications unit (such as communication unit 118).

I/O interface set 122 allows for input and output of data with other devices that may be connected locally in data communication with server computer 116. For example, I/O interface set 122 provides a connection to external device set 134. External device set 134 will typically include devices such as a keyboard, keypad, a touch screen, and/or some other suitable input device. External device set 134 can also include portable computer-readable storage media such as, for example, thumb drives, portable optical or magnetic disks, and memory cards. Software and data used to practice embodiments of the present invention, for example, program 400, can be stored on such portable computer-readable storage media. In these embodiments the relevant software may (or may not) be loaded, in whole or in part, onto persistent storage device 126 via I/O interface set 122. I/O interface set 122 also connects in data communication with display device 132.

Display device 132 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 2:
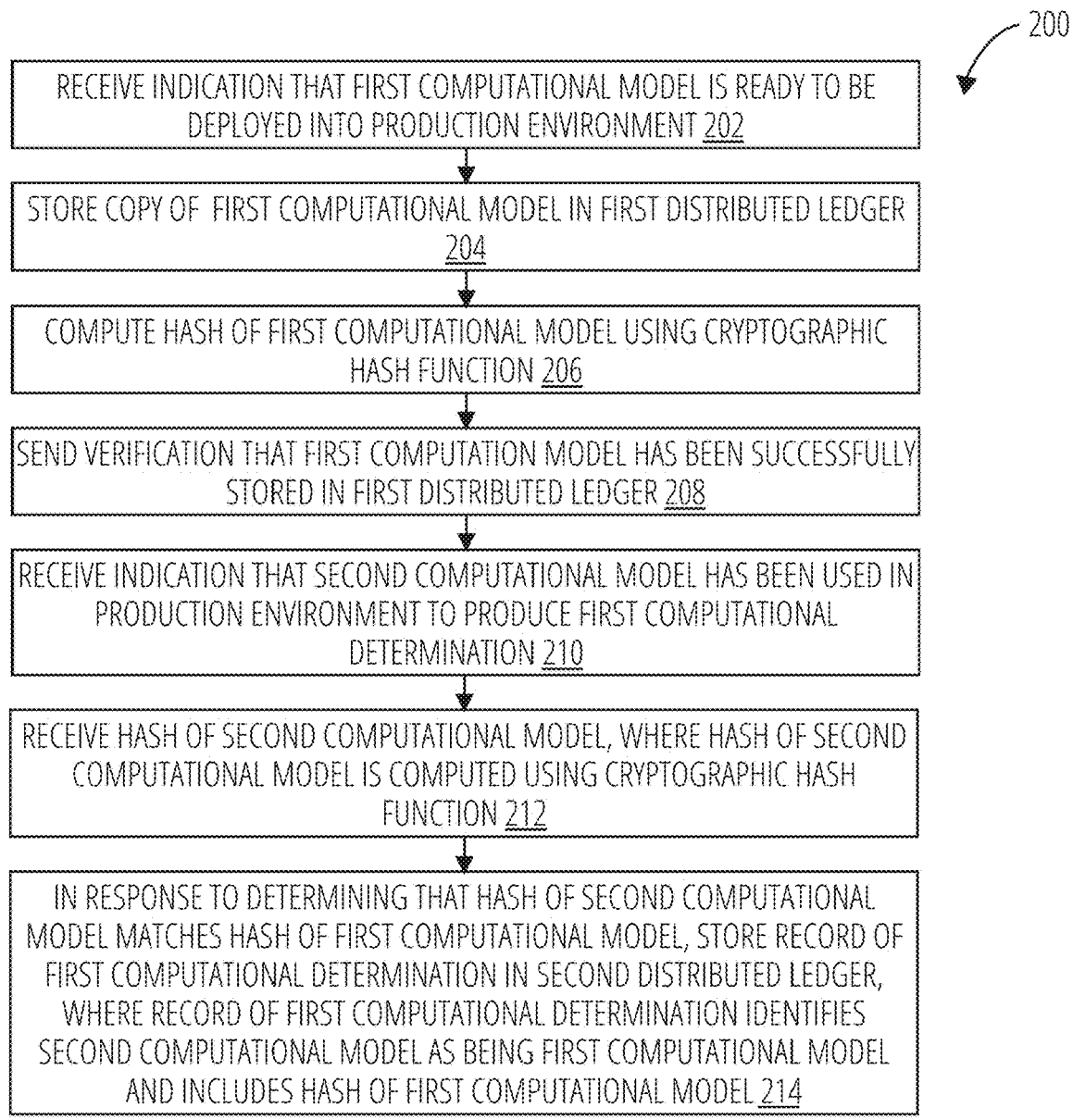
FIG. 2 shows flowchart 200 depicting a method to immutably store a computational model and a record of a computational determination made using the computational model, according to an embodiment of the present invention.
Figure 3:
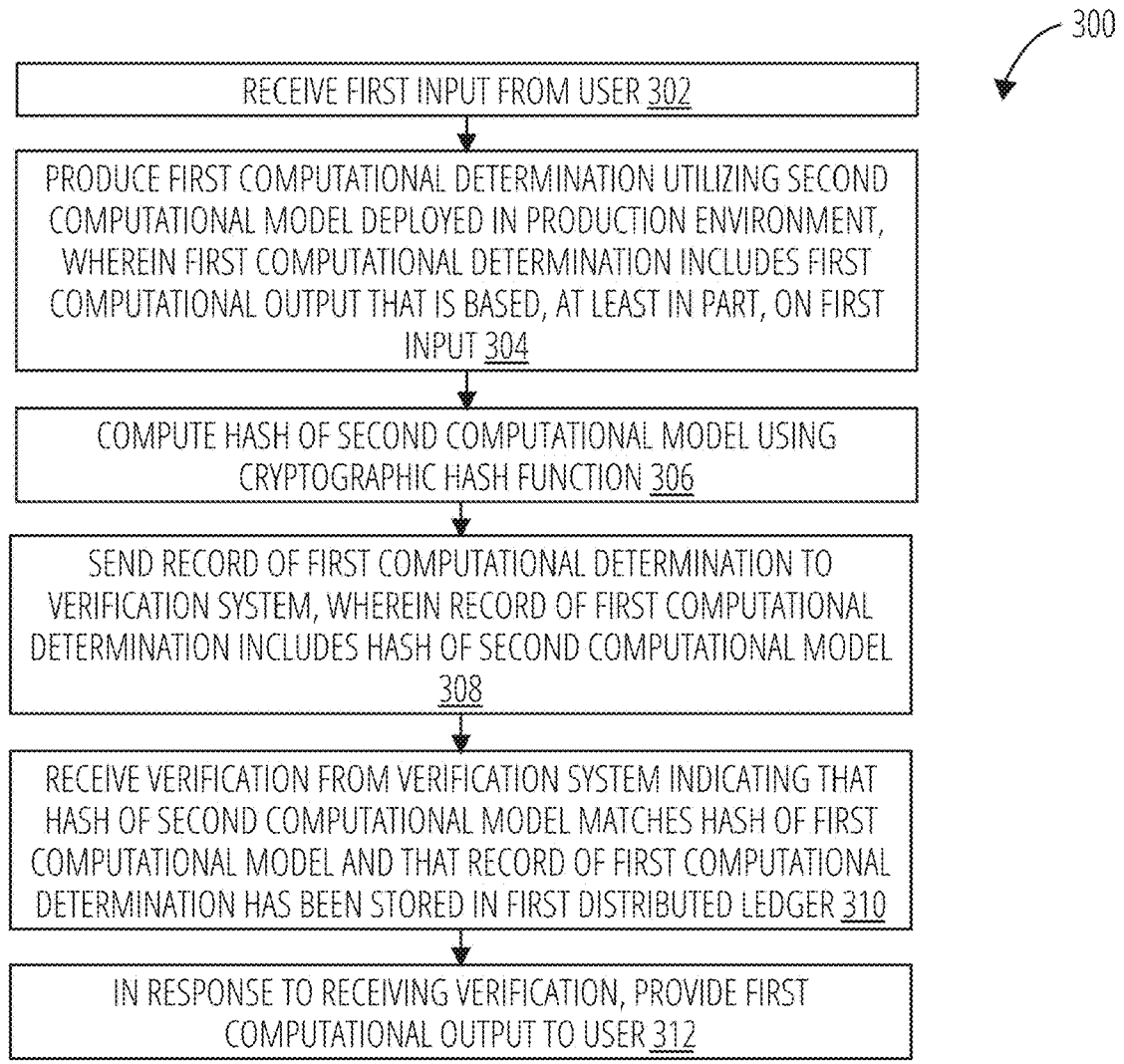
FIG. 3 shows flowchart 300 depicting a method to produce, verify, and provide a computational determination to a user, according to an embodiment of the present invention.
Figure 4:
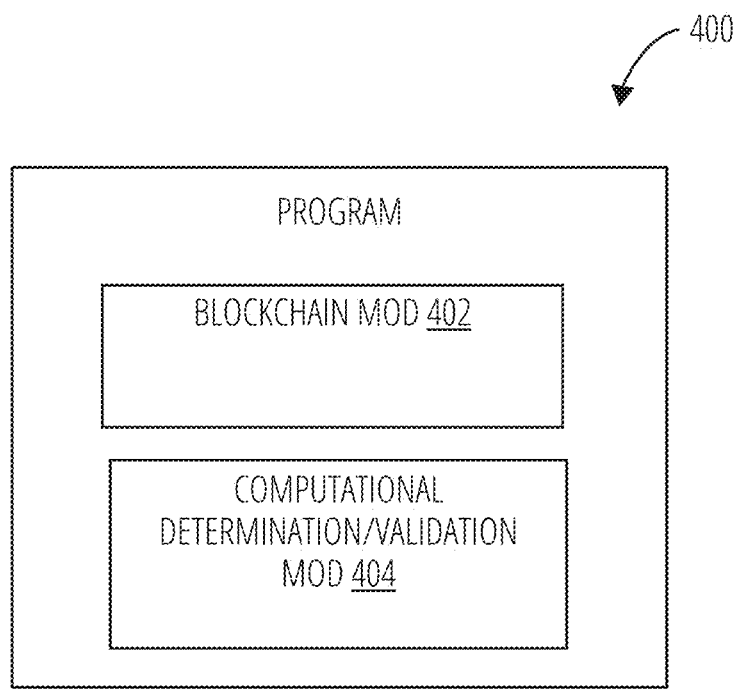
FIG. 4 is a block diagram depicting program 400, according to an embodiment of the present invention.

FIG. 2 shows flowchart 200 depicting a method according to the present invention. FIG. 3 shows flowchart 300 depicting another method according to the present invention. FIG. 4 shows program 400 for performing at least some of the method operations of flowchart 200 and flowchart 300. The methods of flowchart 200 and flowchart 300, and the associated software of program 400, will now be discussed over the course of the following paragraphs, with reference to FIG. 2 and FIG. 3 (for the method operation blocks) and FIG. 4 (for the software module "mod" blocks).

The following paragraphs will also refer extensively to a simple example embodiment (also referred to as the "present example," the "present example embodiment," and the like). In this example embodiment, program 400 is a program with two primary modules ("mods"): blockchain mod 402, for storing information on a blockchain, and computational determination/validation mod 404, for performing computational determinations and providing computational determination output to a user. It should be noted that this example embodiment is described herein for example purposes, in order to help depict the scope of the present invention. As such, other embodiments may be configured in different ways or refer to other features, advantages, and/or characteristics not fully discussed herein.

Referring to flowchart 200 (see FIG. 2), in operation 202, blockchain mod 402 (see FIG. 4) receives an indication that a first computational model is ready to be deployed into a production environment. A computational model, as described herein, is simply a computer program that has been programmed to make decisions (also referred to as "computational determinations") that generally include a set of outputs (also referred to as "computational model outputs" or "computational outputs") based on a set of inputs (also referred to as "computational model inputs" or "inputs"). In many cases, computational models are used to represent—and therefore predict—activity that happens in the "real" (i.e., non-digital) world. For example, computational models can include models for forecasting weather, models for protein folding, and even models for representing or mimicking features of the human brain (for example, neural network models).

In certain embodiments, the first computational model is a Machine Learning ("ML") model. Generally speaking, a ML model is a model that can learn from and make predictions on data, typically by ingesting sample sets of training data. ML models can be trained using supervised learning, which includes pre-labelled data, as well as using semi-supervised or unsupervised learning, which instead rely on finding hidden patterns in unlabeled or underlabeled data. A difference between ML models and certain other types of computational models is that, because ML models are created using training data instead of by writing static algorithms, it can be difficult to determine how a ML model made a particular determination. Furthermore, because ML models have the capacity to learn from their own decisions, it can also be difficult to determine the particular state a ML model was in when it made a given determination. As such, when auditing the computational determinations performed by an ML model, it can be important to have copies of not only each computational determination that was made, but also of each computational model that was used to make each respective determination.

In the present example embodiment, the first computational model is a ML model that has been trained to identify domestic cats (Felis catus) in images. That is, in this embodiment, the first computational model receives images as input, and in response it produces first computational model output in the form of a Boolean determination, with TRUE indicating that an image includes a cat, and with FALSE indicating that an image does not include a cat. In operation 202, blockchain mod 402 receives an indication that the ML model for identifying cats is ready to be deployed in a production environment, so that the model can be used to identify cats in user-submitted images.

In operation 204, blockchain mod 402 stores a copy of the first computational model in a first distributed ledger. By storing the copy of the first computational model in the first distributed ledger, blockchain mod 402 creates an immutable record of the first computational model prior to deployment to production. Because distributed ledgers are designed to store information in a verifiable and permanent way, storing the first computational model itself in a distributed ledger—such as the first distributed ledger—results in a permanent copy of a version of the first computational model prior to deployment.

The first distributed ledger may be distributed across a variety of client computing devices, or "nodes", including, for example, client sub-system 104, client sub-system 106, client sub-system 108, client sub-system 110, and client sub-system 112 of networked computers system 100. The nodes may be controlled by a single entity, such as the company that controls the production environment, or by multiple entities, including, for example, independent third parties and/or regulatory authorities. Consensus for storing the copy of the first computational model in the first distributed ledger may be achieved by any known (or yet to be known) consensus mechanism, including the consensus mechanisms described above.

In some embodiments, including the present example embodiment, the first distributed ledger is a blockchain, and storing the first computational model in the first distributed ledger includes storing the first computational model in a block of the blockchain.

In some embodiments, including the present example embodiment, storing the copy of the first computational model in the first distributed ledger includes storing, in the first distributed ledger, one or more of the following: preprocessing code, preprocessing parameters, model code, model parameters, and/or metadata of the first computational model. In some embodiments, these items are stored in a single entry of the distributed ledger (for example, a block of a blockchain), and in other embodiments, these items are stored in separate entries that are linked such that they can be identified together at a later time (for example, as consecutive blocks in a blockchain).

The preprocessing code and parameters may include any combination of code and parameters needed to prepare inputs for processing by the first computational model. For example, the preprocessing code may be code that converts input into a particular file type or format, and the preprocessing parameters may specify the desired dimensions, metadata, or file size limitations for the conversion. In the present example embodiment, for example, the preprocessing code converts received images into the JPEG format, and the preprocessing parameters define that the converted JPEG images should have a resulting resolution of 1536×1024 pixels. Of course, in other embodiments, other combinations of preprocessing code and/or parameters may be used.

The model code and parameters may include the first computational model itself as well as any information needed for the first computational model to produce computational model output from an input or set of inputs. The model code may be in the form of uncompiled source code, such that each line of code is viewable, or the model code may be compiled object code, such that the code itself is hidden but is nonetheless operable to produce computational model output from an input or set of inputs. In the present example embodiment, for example, the compiled object code of the ML model is used, as the source code would likely not be particularly helpful in determining how the ML model performs its computational determinations. Furthermore, the present example embodiment stores as a model parameter a desired confidence level for outputting a TRUE result. In other words, because the ML model generates a Boolean output (TRUE or FALSE), the ML model includes a configurable parameter that indicates a level of confidence at which the ML model needs to indicate that an image contains a cat in order for the result to be TRUE. For example, a model parameter of 0.8 would result in the ML model outputting TRUE when it determines that an image includes a cat with at least 80% confidence. Of course, in other embodiments, other combinations of model code and/or parameters may be used.

The metadata of the first computational model may be any metadata that may be helpful in identifying the first computational model or otherwise assisting a reviewer/auditor who is reviewing the first computational model at a later time. For example, in some embodiments, the metadata of the first computational model includes a time representing the deployment of the first computational model into the production environment. In the present example embodiment, for example, the time representing the deployment of the first computational model into the production environment is the time that the indication that the first computational model is ready to be deployed into the production environment was received by blockchain mod 402.

In operation 206, blockchain mod 402 computes a hash of the first computational model using a cryptographic hash function. Generally speaking, a purpose of the hash is to create a unique identifier for the first computational model in a manner that is cryptographically difficult to duplicate without having an actual copy of the first computational model, thereby creating a secure way to identify the first computational model. Many known (or yet to be known) cryptographic hash functions may be used, including, but certainly not limited to, MD5, SHA-1, SHA-2, SHA-3, RIPEMD-160, and the like. Furthermore, many different features of the first computational model may be used as inputs for computing the hash, including, but not limited to: (i) model code, (ii) model parameters, (iii) preprocessing code, (iv) preprocessing parameters, (v) metadata of the first computational model, and (vi) combinations thereof. In the present example embodiment, the hash of the first computational model is created by hashing the compiled object code of the first computational model using an MD5 hashing algorithm. In this embodiment, the computed hash is stored in the blockchain along with the information discussed above.

In operation 208, blockchain mod 402 sends a verification that the first computational model has been successfully stored in the first distributed ledger. Generally speaking, the verification is sent to indicate that the first computational model is ready to be deployed in the production environment, and as such may be sent to a deployment environment such as deployment environment 504, discussed below. By making the deployment of the first computational model into production conditional on the storing of the first computational model in the first distributed ledger, program 400, and networked computers system 100 as a whole, can ensure that the first computational model has been immutably stored prior to using the first computational on any live production data. In the present example embodiment, for example, once blockchain mod 402 sends the verification that the first computational model has been successfully stored in the first distributed ledger, the ML model is deployed into production.

In operation 210, blockchain mod 402 receives an indication that a second computational model has been used in the production environment to produce a first computational determination. In other words, in operation 210, blockchain mod 402 receives an indication (for example, from computational determination/validation mod 404) that a first computational determination has been made in the production environment. It should be noted that, at this point, the identity of the second computational model has not yet been determined, and blockchain mod 402 is simply receiving notice that a computational determination has been made so that further action can be taken. In the present example embodiment, for example, not only does the previously described ML model reside in the production environment, but so do a set of other related ML models, including other ML models for identifying cats within images that are trained using slightly different methods. While blockchain mod 402 will ultimately be used to determine whether the second computational model is the same as the first computational model, at the time that blockchain mod 402 receives the indication in operation 210, blockchain mod 402 does not yet have enough information to determine whether the computational determination has been made by the ML model for identifying cats in images or by one of these other ML models.

In operation 212, blockchain mod 402 receives a hash of the second computational model, wherein the hash of the second computational model is computed using the cryptographic hash function. In this operation, instead of performing the hash itself, blockchain mod 402 receives the hash from computational determination/validation mod 404, and will use the hash in the next operation (operation 214) to verify the identity of the second computational model. In other embodiments, the computation of this hash is instead performed by blockchain mod 402. However, it should be noted that in this particular embodiment, in order to ensure data integrity, it is important for the hashes in operation 212 and operation 206 to be computed using information from separate respective locations, with operation 212 involving a computational model deployed in the production environment and with operation 206 involving a computational model that has not yet been deployed.

In operation 214, blockchain mod 402, in response to determining that the hash of the second computational model matches the hash of the first computational model, stores a record of the first computational determination in a second distributed ledger, where the record of the first computational determination identifies the second computational model as being the first computational model and includes the hash of the first computational model. That is, in operation 214, blockchain mod 402 determines that the second computational model and the first computational model are, in fact, the same computational model, and accordingly stores a record of the first computational determination in a second distributed ledger along with an identifier to show that the first computational model was used to make the first computational determination. As such, networked computers system 100 now has two separate, immutable ledgers each storing important components of the computational determination process: the actual computational determinations that were made, and the computational models used to make them. And by using a hash of a computational model prior to deployment and again during production, networked computers system 100 can verify and immutably record the exact version of the computational model that was used for each computational determination.

As with the first distributed ledger, the second distributed ledger may be distributed across a variety of client computing devices, or "nodes", including, for example, client sub-system 104, client sub-system 106, client sub-system 108, client sub-system 110, and client sub-system 112 of networked computers system 100. The nodes may be controlled by a single entity, such as the company that controls the production environment, or by multiple entities, including, for example, independent third parties and/or regulatory authorities. Consensus for storing the record of the first computational determination in the second distributed ledger may be achieved by any known (or yet to be known) consensus mechanism, including the consensus mechanisms described above.

In some embodiments, including the present example embodiment, the second distributed ledger is a blockchain, different from the first distributed ledger's blockchain. In these embodiments, storing the record of the first computational determination in the second distributed ledger includes storing the record in a block of the second distributed ledger's blockchain.

The record of the first computational determination that is stored in the second distributed ledger may comprise any of a wide variety of information about the first computational determination that may be helpful to a reviewer/auditor who is reviewing the first computational determination at a later time. For example, in some embodiments, the record of the first computational determination includes the first computational model output and the first computational model input. In the present example embodiment, for example, this includes an input image along with the Boolean value of TRUE or FALSE indicating whether the input image includes a cat. In some embodiments, the record is stored in a single entry of the second distributed ledger (for example, a block of a blockchain), and in other embodiments, the different items of the record are stored in separate entries that are linked such that they can be identified together at a later time (for example, as consecutive blocks in a blockchain).

While the foregoing description and examples relating to FIG. 2 describe the process for a single computational model and a single computational determination to be stored in respective distributed ledgers, embodiments of the present invention recognize that the respective distributed ledgers are also capable of storing multiple computational models and/or computational determinations for later analysis. For example, in an embodiment, blockchain mod 402 receives an indication that a third computational model is ready to be deployed into the production environment. In this embodiment, blockchain mod 402 then stores the third computational model in the first distributed ledger in a ledger entry that succeeds the entry where the first computational model is stored. Furthermore, blockchain mod 402 may also, when storing the third computational model, include the hash of the first computational model in the same ledger entry as the third computational model, such as in a block in a blockchain (where blockchain blocks generally include a cryptographic hash of the previous block). Similarly, in another (or the same) embodiment, blockchain mod 402 may receive an indication that a fourth computational model has been used in the production environment to produce a second computational determination. In this embodiment, blockchain mod 402 may then receive a hash of the fourth computational model and, in response to determining that the hash of the fourth computational model matches either the hash of the first computational model or a hash of the third computational model, store a record of the second computational determination in the second distributed ledger, wherein the record of the second computational determination identifies the fourth computational model as being either the first computational model or the third computational model, and includes the hash of the fourth computational model or the hash of the second computational model, such as in a block in a blockchain.

Referring now to flowchart 300 (see FIG. 3), in operation 302, computational determination/validation mod 404 receives a first input from a user. Generally speaking, the first input is input for which the user desires a computational determination to be made by a computational model. The type and form of the input can vary, depending on the particular requirements of a given computational model. For example, in some embodiments, the input is numeric or alphanumeric. In other embodiments, the input is a file type; for example, in the present example embodiment, the input is an image file. In still other embodiments, the input is a complex combination of values; for example, when the computational model is a weather prediction model, the inputs can include large quantities of current and past observational weather data (for example, temperature, precipitation, visibility, etc.).

In operation 304, computational determination/validation mod 404 produces the first computational determination utilizing the second computational model deployed in the production environment. As mentioned above, the first computational determination includes the first computational output that is based, at least in part, on the first input. While in the current example embodiment, the first computational output includes a Boolean value of TRUE or FALSE, the first computational output can be any kind of output that the second computational model is capable of producing. For example, in some embodiments, the first computational output is numeric or alphanumeric. In other embodiments, the first computational output is a file—such as an image file, an audio file, or a video file. In still other embodiments, the first computational output is a complex combination of values; for example, when the second computational model is a weather prediction model, the first computational output includes a complete weather forecast comprising a plurality of values for a plurality of locations.

In operation 306, computational determination/validation mod 404 computes a hash of the second computational model using the cryptographic hash function, using the same inputs that were used for the first computational model, but instead for the second computational model. In the present example embodiment, the hash of the second computational model is created by hashing the compiled object code of the second computational model using an MD5 hashing algorithm, as discussed above in relation to hashing the first computational model.

In operation 308, computational determination/validation mod 404 sends a record of the first computational determination to a verification system, in this case blockchain mod 402. Generally speaking, the purpose of computational determination/validation mod 404 sending the record of the first computational determination to blockchain mod 402 is twofold: (i) for blockchain mod 402 to verify, using the first distributed ledger, the computational model that was used to produce the first computational determination, and (ii) to document information pertaining to the first computational determination for later review/analysis. As such, the record of the first computational determination includes at least the hash of the second computational model, and in many cases—including the present example embodiment—the record also includes the first input and the first computational model output.

In operation 310, computational determination/validation mod 404 receives a verification from the verification system (blockchain mod 402) indicating that the hash of the first computational model matches the hash of the second computational model and that the record of the first computational determination has been stored in the second distributed ledger. In other words, computational determination/validation mod 404 receives verification that the record of the first computational determination has been matched to a computational model and then immutably stored in the second distributed ledger. Then, in operation 312, computational determination/validation mod 404, in response to receiving the verification, provides the first computational output to the user.

While the foregoing description and examples relating to FIG. 3 describe a process for producing and validating a single computational determination, embodiments of the present invention recognize that the networked computers system 100 described herein is also capable of producing and validating many additional computational determinations. For example, in an embodiment, computational determination/validation mod 404 receives a second input from a user (whether the user described above in relation to operation 302 or a different user), produces a second computational determination utilizing the second computational model (or a different computational model), computes a hash, sends a record, receives verification, and provides the second computational determination to the user.

Certain embodiments of the present invention further provide a mechanism for reviewing and/or auditing the production of certain computational determinations made by computational determination/validation mod 404 of networked computers system 100. In one of these embodiments, computational determination/validation mod 404 receives a request from an auditing entity to audit the production of the first computational determination. Then, in response to receiving the request to audit the production of the first computational determination, computational determination/validation mod 404 retrieves from blockchain mod 402 the record of the first computational determination stored in the second distributed ledger, and provides at least a portion of the retrieved record of the first computational determination to the auditing entity.

The request to audit the production of the first computational determination may identify the first computational determination in one or more of several possible ways. For example, in some embodiments, the request to audit the production of the first computational determination identifies the first computational determination using the first input. In other embodiments, the request to audit the production of the first computational determination identifies the first computational determination using the first computational output. In still other embodiments, the request to audit the production of the first computational determination identifies the first computational determination using both the first input and the first computational output.

In some embodiments, providing the at least a portion of the retrieved record of the first computational determination to the auditing entity includes providing the first input and the first computational output to the auditing entity. However, in other embodiments, the amount of information provided to the auditing entity is limited based on rule and/or policy. For example, in a situation where the first input includes personal information of an individual, computational determination/validation mod 404 may provide a modified version of the first input to the auditing entity where all or some of the personal information has been redacted.

In some embodiments, responding to the request to audit the production of the first computational determination further includes computational determination/validation mod 404 further retrieving from blockchain mod 402 the first computational model that matches the second computational model, where blockchain mod 402 provides the stored copy of the first computational model. In these embodiments, blockchain mod 402 determines the corresponding model to provide based on the record of the first computational determination in the second distributed ledger. Once computational determination/validation mod 404 has retrieved the first computational model from blockchain mod 402, computational determination/validation mod 404 provides the first computational model to the auditing entity. Again, as with the information relating to the first computational determination, computational determination/validation mod 404 may, based on rule and/or policy, provide only a portion of the first computational model to the auditing entity. For example, computational determination/validation mod 404 may provide access to the first computational model for providing additional inputs/outputs but might not provide access to the first computational model's underlying source code.

Figure 5:
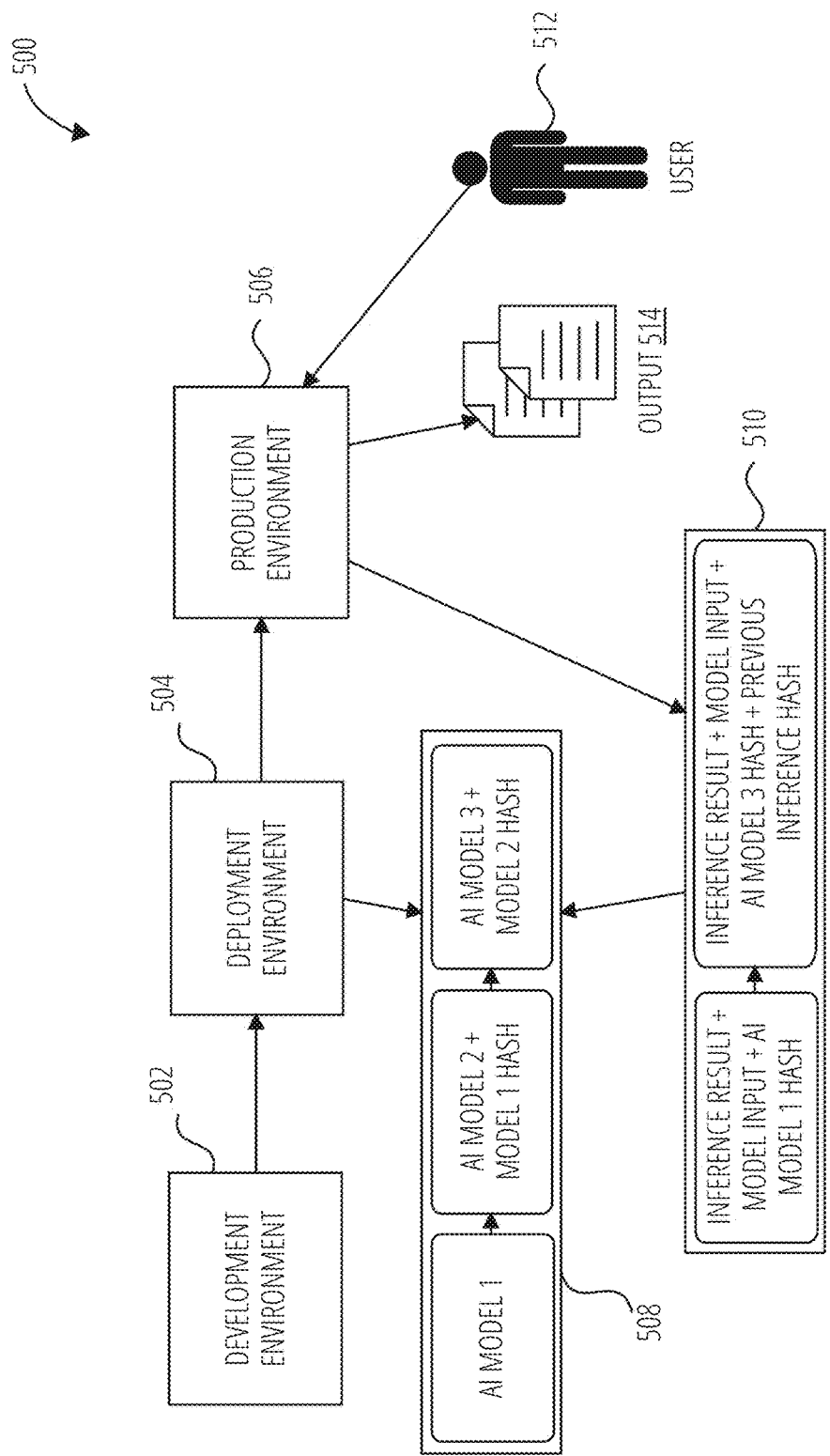
FIG. 5 illustrates computational determination environment 500, in accordance with an embodiment of the present invention.

FIG. 5 illustrates computational determination environment 500, in accordance with an embodiment of the present invention. As shown, computational determination environment 500 comprises a development environment 502, a deployment environment 504, a production environment 506, an AI model blockchain 508, and an inference data blockchain 510. In this embodiment, artificial intelligence (AI) models (i.e., computational models) are developed in development environment 502. When the AI models are ready for deployment, they are moved to deployment environment 504, where they are added to AI model blockchain 508 (i.e., a first distributed ledger) according to methods described above. Once the AI models are added to AI model blockchain 508, they are moved to production environment 506. Then, in response to a user 512 providing user input, the AI models generate AI inferences (i.e., computational determinations) including inference results (i.e., computational model output) based on model input (i.e., the user input), and the results of those inferences are added to inference data blockchain 510 (i.e., a second distributed ledger). As shown, in accordance with how blockchain blocks are typically structured, each block in AI model blockchain 508 and in inference data blockchain 510 includes the hash of the block preceding it in the blockchain, where applicable. Further, as described above, each inference added to inference data blockchain 510 includes a hash of an AI model that corresponds to the hash of an AI model in the AI model blockchain 508. Once the AI inferences are added to the inference data blockchain 510, the inference results are provided to user 512 as output 514.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   receiving a first input from a user;
   producing a first artificial intelligence (AI) inferencing event utilizing a first machine learning model deployed in a production environment, wherein the first AI inferencing event includes a first AI inferencing result produced by the first machine learning model based, at least in part, on the first input;
   computing a hash of the first machine learning model using a cryptographic hash function;
   sending a record of the first AI inferencing event to a verification system, wherein the record of the first AI inferencing event includes the hash of the first machine learning model;
   receiving a verification from the verification system indicating that the hash of the first machine learning model matches a hash of a second machine learning model and that the record of the first AI inferencing event has been stored in a first distributed ledger; and
   in response to receiving the verification, providing the first AI inferencing result to the user.

2. The computer-implemented method of claim 1, wherein the record of the first AI inferencing event further includes the first input and the first AI inferencing result.

3. The computer-implemented method of claim 2, further comprising:
   receiving a receiving a request from an auditing entity to audit the production of the first AI inferencing event;
   in response to receiving the request to audit the production of the first AI inferencing event, retrieving from the verification system the record of the first AI inferencing event stored in the first distributed ledger; and
   providing at least a portion of the retrieved record of the first AI inferencing event to the auditing entity.

4. The method of claim 3, wherein the request to audit the production of the first AI inferencing event includes an identification selected from the group consisting of: the first input and the first AI inferencing result.

5. The method of claim 3, wherein providing the at least a portion of the retrieved record of the first AI inferencing event to the auditing entity includes providing the first input and the first AI inferencing result to the auditing entity.

6. The method of claim 3, further comprising:
   in response to receiving the request to audit the production of the first AI inferencing event, further retrieving from the verification system the second machine learning model that matches the first machine learning model, wherein the second machine learning model is stored on a second distributed ledger; and
   providing the second machine learning model to the auditing entity.

7. A computer program product comprising a computer readable storage medium having program instructions embodied therewith, wherein the computer readable storage medium is not a transitory signal per se, the program instructions executable by a processor to cause the processor to perform a method comprising:
   receiving a first input from a user;
   producing a first artificial intelligence (AI) inferencing event utilizing a first machine learning model deployed in a production environment, wherein the first AI inferencing event includes a first AI inferencing result produced by the first machine learning model based, at least in part, on the first input;

computing a hash of the first machine learning model using a cryptographic hash function;

sending a record of the first AI inferencing event to a verification system, wherein the record of the first AI inferencing event includes the hash of the first machine learning model;

receiving a verification from the verification system indicating that the hash of the first machine learning model matches a hash of a second machine learning model and that the record of the first AI inferencing event has been stored in a first distributed ledger; and in response to receiving the verification, providing the first AI inferencing result to the user.

8. The computer program product of claim 7, wherein the record of the first AI inferencing event further includes the first input and the first AI inferencing result.

9. The computer program product of claim 8, wherein the method further comprises:

receiving a receiving a request from an auditing entity to audit the production of the first AI inferencing event;

in response to receiving the request to audit the production of the first AI inferencing event, retrieving from the verification system the record of the first AI inferencing event stored in the first distributed ledger; and providing at least a portion of the retrieved record of the first AI inferencing event to the auditing entity.

10. The computer program product of claim 9, wherein the request to audit the production of the first AI inferencing event includes an identification selected from the group consisting of: the first input and the first AI inferencing result.

11. The computer program product of claim 9, wherein providing the at least a portion of the retrieved record of the first AI inferencing event to the auditing entity includes providing the first input and the first AI inferencing result to the auditing entity.

12. The computer program product of claim 9, wherein the method further comprises:

in response to receiving the request to audit the production of the first AI inferencing event, further retrieving from the verification system the second machine learning model that matches the first machine learning model, wherein the second machine learning model is stored on a second distributed ledger; and providing the second machine learning model to the auditing entity.

13. A computer system comprising:
one or more processors; and
a computer readable storage medium
wherein:

the one or more processors are structured, located, connected, and/or programmed to execute program instructions stored on the computer readable storage medium; and the program instructions, when executed by the one or more processors, cause the one or more processors to perform a method comprising:

receiving a first input from a user;

producing a first artificial intelligence (AI) inferencing event utilizing a first machine learning model deployed in a production environment, wherein the first AI inferencing event includes a first AI inferencing result produced by the first machine learning model based, at least in part, on the first input;

computing a hash of the first machine learning model using a cryptographic hash function;

sending a record of the first AI inferencing event to a verification system, wherein the record of the first AI inferencing event includes the hash of the first machine learning model;

receiving a verification from the verification system indicating that the hash of the first machine learning model matches a hash of a second machine learning model and that the record of the first AI inferencing event has been stored in a first distributed ledger; and in response to receiving the verification, providing the first AI inferencing result to the user.

14. The computer system of claim 13, wherein the record of the first AI inferencing event further includes the first input and the first AI inferencing result.

15. The computer system of claim 14, wherein the method further comprises:

receiving a receiving a request from an auditing entity to audit the production of the first AI inferencing event;

in response to receiving the request to audit the production of the first AI inferencing event, retrieving from the verification system the record of the first AI inferencing event stored in the first distributed ledger; and providing at least a portion of the retrieved record of the first AI inferencing event to the auditing entity.

16. The computer system of claim 15, wherein the request to audit the production of the first AI inferencing event includes an identification selected from the group consisting of: the first input and the first AI inferencing result.

17. The computer system of claim 15, wherein providing the at least a portion of the retrieved record of the first AI inferencing event to the auditing entity includes providing the first input and the first AI inferencing result to the auditing entity.

* * * * *